United States Patent
Möster et al.

(10) Patent No.: US 6,341,227 B1
(45) Date of Patent: Jan. 22, 2002

(54) METHOD AND APPARATUS FOR REDUCING EFFECT OF MISMATCHES AND INCREASING THE RIGIDITY OF MOBILE COMMUNICATION DEVICE

(75) Inventors: Erik Möster; Paul Larsson; Mats Olsson, all of Malmö ; Olof Simonsson, Lund; Mats Larsson; Rafael Portela, both of Malmö, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/330,913

(22) Filed: Jun. 11, 1999

(51) Int. Cl.[7] .................................................. H04B 1/38
(52) U.S. Cl. .......................... 455/550; 455/90; 455/575
(58) Field of Search .......................... 455/73, 90, 550, 455/575, 89, 557; 379/433, 430, 428, 434, 440, 441; D14/137, 138

(56) References Cited

U.S. PATENT DOCUMENTS

| | | |
|---|---|---|
| 5,276,588 A | 1/1994 | Repplinger et al. |
| D346,171 S * | 4/1994 | Ratcliffe .................... D14/248 |
| 5,537,472 A * | 7/1996 | Estevez-Alcolado et al. .... 379/433 |
| 5,636,105 A | 6/1997 | Inomata et al. |
| 6,108,417 A * | 8/2000 | Thomas et al. .............. 379/433 |
| 6,126,454 A * | 10/2000 | Flegeo .......................... 439/67 |
| 6,151,485 A * | 11/2000 | Crisp ........................... 455/90 |

FOREIGN PATENT DOCUMENTS

| | | |
|---|---|---|
| DE | 4241257 | 12/1992 |
| EP | 695044 | 1/1996 |
| FR | 2737837 | 2/1997 |
| IT | 0610689 | 8/1974 |
| JP | 5235559 | 9/1993 |
| WO | 97/43921 | 11/1997 |

* cited by examiner

*Primary Examiner*—Thanh Congle
*Assistant Examiner*—Pablo N Tran
(74) *Attorney, Agent, or Firm*—Burns, Doane, Swecker & Mathis, L.L.P.

(57) ABSTRACT

A housing for a device like a mobile phone has a front cover and a back cover mechanically connected to the front cover. A cover connector member is connected along the seam between the front and back covers to reduce the effects of mismatches in cosmetic appearances and in mechanical connections between the front and back covers. A method of assembling the device includes mechanically connecting the front and back covers to form a housing and mechanically connecting a cover connector member to the housing.

17 Claims, 3 Drawing Sheets

METHOD AND APPARATUS FOR REDUCING EFFECT OF MISMATCHES AND INCREASING THE RIGIDITY OF MOBILE COMMUNICATION DEVICE

BACKGROUND

The present invention relates to mobile communication devices and manufacturing methods for mobile communication devices. More particularly, the present invention relates to structural components and manufacturing techniques for hiding mismatches between mobile phone housing components and for increasing the structural rigidity of mobile telephones.

A mobile telephone comprises a printed circuit board that includes various electrical and electromechanical components encapsulated by a front cover and a back cover. The printed circuit board is secured between the front cover and back cover, which are designed to fit together with appropriate fasteners. The front and back cover are typically manufactured from a rigid polymeric material using known plastics manufacturing techniques such as, for example, injection molding techniques. In some instances, a metal frame may be used in the place of the back cover to enhance the structural integrity of the phone.

The production of mobile telephones is characterized by high-volume manufacturing and assembly techniques. In a high-volume manufacturing environment, multiple suppliers may be used for various component sets to mitigate the risk of work flow problems at any given supplier. In particular, it is common practice in the mobile phone manufacturing industry to use multiple suppliers for the covers of mobile phones, such that the back cover of a given mobile phone may be manufactured by a first supplier and the front cover of the same mobile phone may be manufactured by a second supplier.

Frequently there are slight variations between suppliers in the cosmetic appearance (e.g., color, surface texture) of covers manufactured by different suppliers. These slight variations are most detectable along the seam, or interface, between the front cover and the back cover. Although these variations are not detrimental to the operational performance of a mobile phone, they may have a negative impact on consumer perception of the phone. Also, variations between suppliers in normal manufacturing tolerances may cause mismatches between components located on the front and back covers that are intended to cooperate mechanically or to physically interconnect the covers. These mismatches may cause a poor mechanical connection between the front cover and the back cover. A poor mechanical connection between the front and back cover of a mobile phone can contribute to a number of quality issues associated with the phone. For example, a poor mechanical connection between the front cover and the back cover may allow slight relative movement between the covers in the assembled mobile phone. Although the range of motion is typically not sufficient to affect the function of the phone, the movement may have a negative impact on consumer perception of the phone. A poor mechanical connection between the front and back cover may also cause the assembled phone to be less mechanically rigid. This may also have a negative impact on consumer perception of the phone.

Thus, there is a need to address various issues associated with mismatches between mechanically mating components, particularly front and back covers, of mobile communication devices, including mobile telephones. The present invention provides novel components and assembly techniques to reduce negative effects associated with mismatches in components of mobile communication devices.

SUMMARY

The present invention addresses these problems by providing a mechanism connectable to the front and back covers of a mobile communication device such as, for example, a mobile phone that conceals portions of the seam between the covers such that cosmetic mismatches between the front cover and the back cover are rendered less apparent to a casual observer of the communication device. Preferably, the mechanism also facilitates securing the front and back covers of the device, thereby contributing to the rigidity of the phone. Advantageously, the invention provides these benefits with a single, simple, low-cost component. Due in part to its simplicity, the component may be connected to the housing of a mobile phone in a single manufacturing step, thereby contributing to the production efficiency of a communication device manufactured according to the present invention.

In one aspect, the invention provides a mobile communication device. The device includes a printed circuit board having electrical and electromechanical components for transceiving electromagnetic signals, a housing including a front cover mechanically connectable to a back cover to define a seam between the front cover and the back cover, and a cover connector member including a first leg and a second leg connected by a base. The cover connector member is mechanically connectable to the exterior of the housing such that the cover connector member covers a portion of the seam between the front cover and back cover of the mobile phone.

In another aspect, the invention provides a housing for a mobile communication device. The housing includes a back cover adapted to receive a printed circuit board having electrical circuitry and electromechanical components disposed thereon, a front cover connectable to the back cover along a seam, and a cover connector member including a first leg and a second leg connected by a base. The cover connector member is mechanically connectable to the exterior of the housing, such that the cover connector member covers a portion of the seam between the front cover and back cover of the mobile phone.

In yet another aspect, the invention provides a method of assembling a mobile communication device. The method includes the steps of connecting a printed circuit board to a first cover, connecting a second cover to the first cover, thereby encapsulating the printed circuit board between the first and second covers, and connecting a cover connector member to the seam between the first and second housing members.

According to the various aspects of the invention, a cost-effective, mechanically simple, and production-efficient solution to certain of the previously discussed problems associated with high-volume manufacturing of mobile telephones is provided.

DETAILED DESCRIPTION

Figure 1:
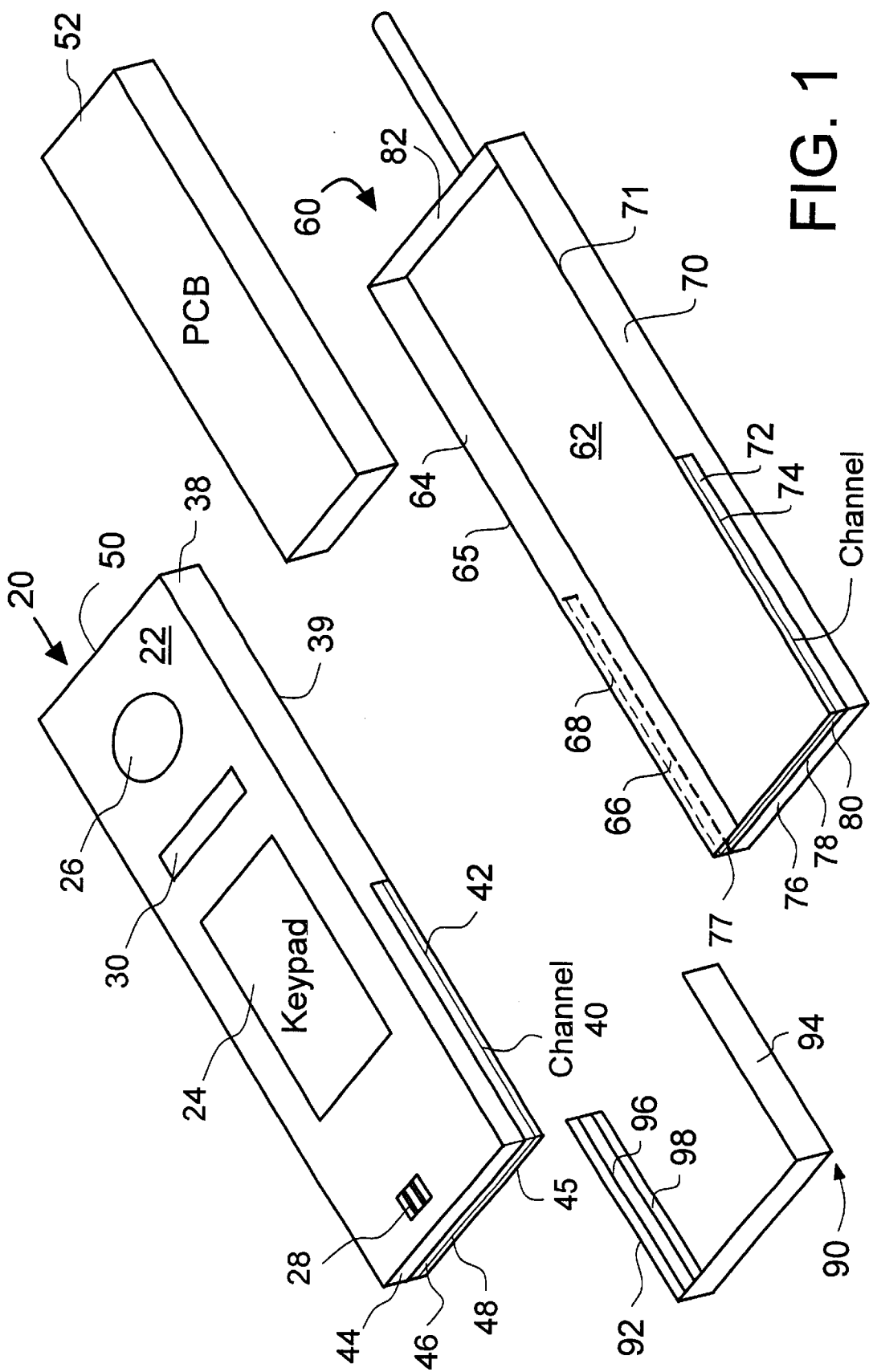
FIG. 1 is an exploded, perspective view of a mobile phone according to one embodiment of the present invention.

The present invention will be explained with reference to exemplary embodiments depicted in the drawings, but it will be appreciated that the particular embodiments described herein are presented for purposes of illustration and are not intended to be limiting.

FIG. 1 presents an exploded, perspective view of a mobile communication device in accordance with one embodiment of the present invention. The communication device depicted in FIG. 1 is a mobile phone but it will be appreciated that the present invention is not limited to phones. The present invention is equally applicable to personal digital assistants (PDAs) and other devices. Further, as new digital technologies develop, it is anticipated that the present invention will be applicable to many devices not yet invented.

Referring to FIG. 1, an exemplary mobile phone 10 comprises a front cover 20, a printed circuit board 52, a back cover 60 and a cover connector member 90. Front cover 20 includes a front panel 22 having a first opening 24 for receiving a keypad (not shown) for operating mobile phone 10 and a second opening 26 for the speaker (not shown) of the phone and a third opening 28 for the microphone (not shown). Front panel 22 further includes an opening 30 for receiving a display such as, for example, a liquid crystal display or a light emitting diode display commonly used in mobile phones and other electronic equipment. Front panel 22 is depicted as having a substantially planar surface, however it will be appreciated that the surface of front panel may be contoured or angled.

Front cover 20 further includes two side walls and two end walls depending from the edges of front panel 22. Opposing side walls 32, 38 extend substantially at right angles from front panel 22 and terminate at respective edges 33, 39. Side wall 32 (FIG. 2) has a recess 34 formed therein that extends along a longitudinal axis adjacent edge 33. A locking channel 36 formed on the surface of side wall 32 in recess 34 extends along a longitudinal axis adjacent edge 33. As discussed in greater detail below, recess 34 receives a portion of cover connector member 90 and locking channel 36 retains cover connector member 90 to front cover 20. In the embodiment depicted in FIG. 1 front cover 20 is substantially symmetrical about a longitudinal axis extending through front cover 20. Side wall 38 also has a recess 40 adjacent edge 39 for receiving a portion of cover connector member 90 and a corresponding locking channel 42 for retaining cover connector member 90 to front cover 20. End wall 44 also extends from front panel 22 substantially at a right angle and terminates at an edge 45. End wall 44 includes a recess 46 adjacent edge for receiving a portion of cover connector member 90. A locking channel 48 formed on the surface of end wall 44 in recess 46 also serves to secure a portion of cover connector member 90 to front cover 20. In the disclosed embodiment, end wall 50 extending from front panel 22 does not require a recess or locking channel. However, one of ordinary skill in the art will appreciate that end wall 50 may include a similar recess and locking channel if desired.

Printed circuit board 52 is depicted schematically in FIG. 1. The precise configuration and contents of printed circuit board 52 are not critical to the present invention. Printed circuit board 52 preferably includes the necessary electrical and electromechanical components for device 10.

Back cover 60 includes a back panel 62 having two side walls and two end walls depending from the edges of back panel 62. Opposing side walls 64, 70 extend substantially at right angles from back panel 62 and terminate at respective edges 65, 71. Side wall 64 (See FIG. 2) has a recess 66 formed therein that extends along a longitudinal axis adjacent edge 65. A locking channel 68 formed on the surface of side wall 64 in recess 66 extends along a longitudinal axis adjacent edge 65. As discussed in greater detail below, recess 66 receives a portion of cover connector member 90 and locking channel 68 connects cover connector member 90 to back cover 60. In the embodiment depicted in FIG. 1 back cover 60 is substantially symmetrical about a longitudinal axis extending through back cover 60. Side wall 70 also has a recess 72 adjacent edge 71 for receiving a portion of cover connector member 90 and a corresponding locking channel 80 for retaining cover connector member 90 to back cover 60. End wall 76 also extends from back panel 62 substantially at a right angle and terminates at an edge 77. End wall 76 includes a recess 78 adjacent edge 77 for receiving a portion of cover connector member 90. A locking channel 80 formed on the surface of end wall 76 in recess 78 also serves to secure a portion of cover connector member 90 to back cover 60. In the disclosed embodiment, end wall 82 extending from back panel 62 does not require a recess or locking channel. However, one of ordinary skill in the art will appreciate that end wall 82 may include a similar recess and locking channel if desired.

In the embodiment depicted in FIG. 1, back cover 60 is further adapted to receive and retain printed circuit board 52. Printed circuit board 52 may be secured to back cover 60 using conventional fastening techniques. Suitable fastening techniques include snap-fit techniques, deformation techniques, screws or other mechanical fasteners, rivets, etc.

Figure 3:
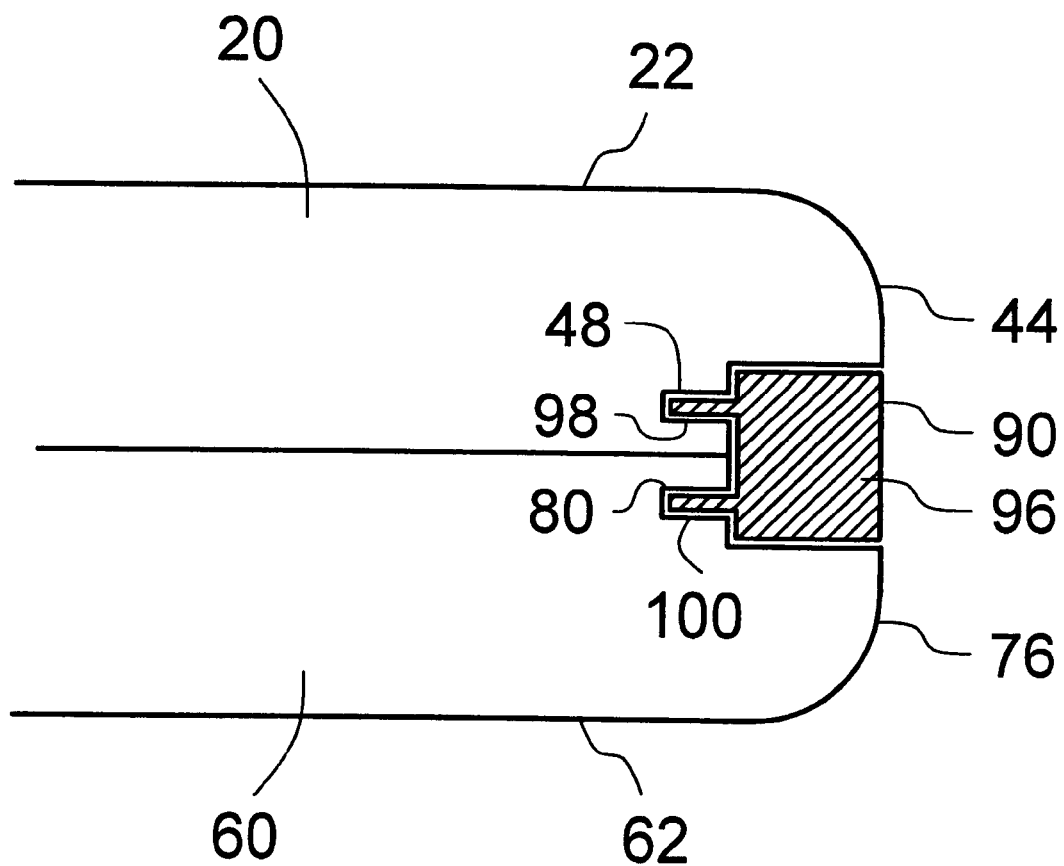
FIG. 3 is a side view of a partially assembled mobile phone according to one embodiment of the present invention.

Cover connector member 90 is depicted in FIG. 1 as a substantially U-shaped bracket having a first leg portion 92 and a second leg portion 94 connected by base 96. A first locking member 98 and a second locking member 100 depend from the inner surface of cover connector member 90 and extend substantially perpendicular to the inner surface (FIG. 3). The dimensions of cover connector member 90 are determined by the dimensions of mobile phone 10. In particular, stabilizing member 90 is dimensioned such that the inner dimensions of stabilizing member correspond with outer dimensions of the recessed portions of front cover 20 and back cover 60, as discussed below.

Front cover 20, back cover 60, and cover connector member 90 preferably are manufactured from a material that is relatively strong, lightweight, shock resistant, and easily formable. In practice, front cover 20, back cover 60 and/or cover connector member 90 may be made from a suitable plastic composite using injection molding manufacturing techniques. Alternatively, front cover 20, back cover 60 and/or cover connector member 90 may be formed from a suitable metal alloy including, but not limited to aluminum alloys, magnesium alloys, zinc alloys, stainless steel alloys, and titanium using metal forming processes including, but not limited to, die-casting, thixomolding.

Having described in detail the components of an embodiment of a mobile phone according to an embodiment of the present invention, an exemplary method for assembling such a phone will now be described.

One method of assembling a mobile phone according to the present invention includes connecting printed circuit board 52 to back cover 60. In the mobile phone assembly industry, it is common for substantially all the electrical and electromechanical components of a mobile phone to be provided by a single manufacturer attached to a printed circuit board. Printed circuit board 52 may be connected to back cover 60 using conventional mechanical fastening techniques including, but not limited to, snap-fit techniques, screws, rivets, and/or soldering. In the event that all necessary electrical and electromagnetic components are not secured to printed circuit board 52, these components may be connected to back cover and/or front cover 20 as necessary.

After the electrical and electromechanical components are connected to the appropriate cover, front cover 20 and back cover 60 are connected to one another to form a housing for the mobile phone. Front cover 20 and back cover 60 are dimensioned such that they fit together along a seam parallel to the edges of the respective side and end walls. In practice, front cover 20 and back cover 60 may be manufactured such that the edges of front cover 20 snap-fit to the corresponding edges of back cover 60, thereby encapsulating printed circuit board 50 between front cover 20 and back cover 60. Further, it will be appreciated that other mechanical fastening techniques, including, but not limited to, screws, rivets, and/or soldering, may be used to connect front cover 20 and back cover 60.

Cover connector member 90 is then connected to front cover 20 and back cover 60. In a preferred method, cover connector member 90 is secured within the channels formed in the side walls of front cover 20 and back cover 60. More particularly, cover connector member 90 is positioned such that the portion of first locking member 96 at the end of first leg 92 is disposed within locking channel 36 of top cover 20 and the portion of first locking member 96 at the end of second leg 92 is disposed within locking channel 42 of top cover 20. Similarly, the portion of second locking member 98 at the end of first leg 92 is disposed within locking channel 68 of bottom cover 60 and the portion of second locking member 98 at the end of second leg 92 is disposed within locking channel 74 of bottom cover 60. Cover connector member 90 may then be slidably engaged by applying an axial force to the base 96 of cover connector member 90 in the direction of the phone housing. In this manner, cover connector member 90 is slid into engagement with top cover 20 and bottom cover 60 until the portion of first locking member 98 at the base 96 of cover connector member 90 engages with locking channel 48 of end wall 44 of top cover 20 and the portion of second locking member 100 at the base 96 of cover connector member 90 engages with locking channel 80 of end wall 76 of bottom cover 60, thereby securing cover connector member 90 with three sides of mobile phone 10.

In an alternate method, cover connector member 90 may be temporarily deformed by bending the first leg 92 and/or second leg 94 by an amount sufficient to allow cover connector member 90 to fit into the recesses formed in the walls of top cover 20 and bottom cover 60 prior to engaging locking members 98, 100 into their respective locking channels. Cover connector member 90 may then be engaged with top cover 20 and bottom cover 60 by applying a compressive force to the first leg 92, second leg 94 and base 96 of cover connector member 90.

Figure 2:
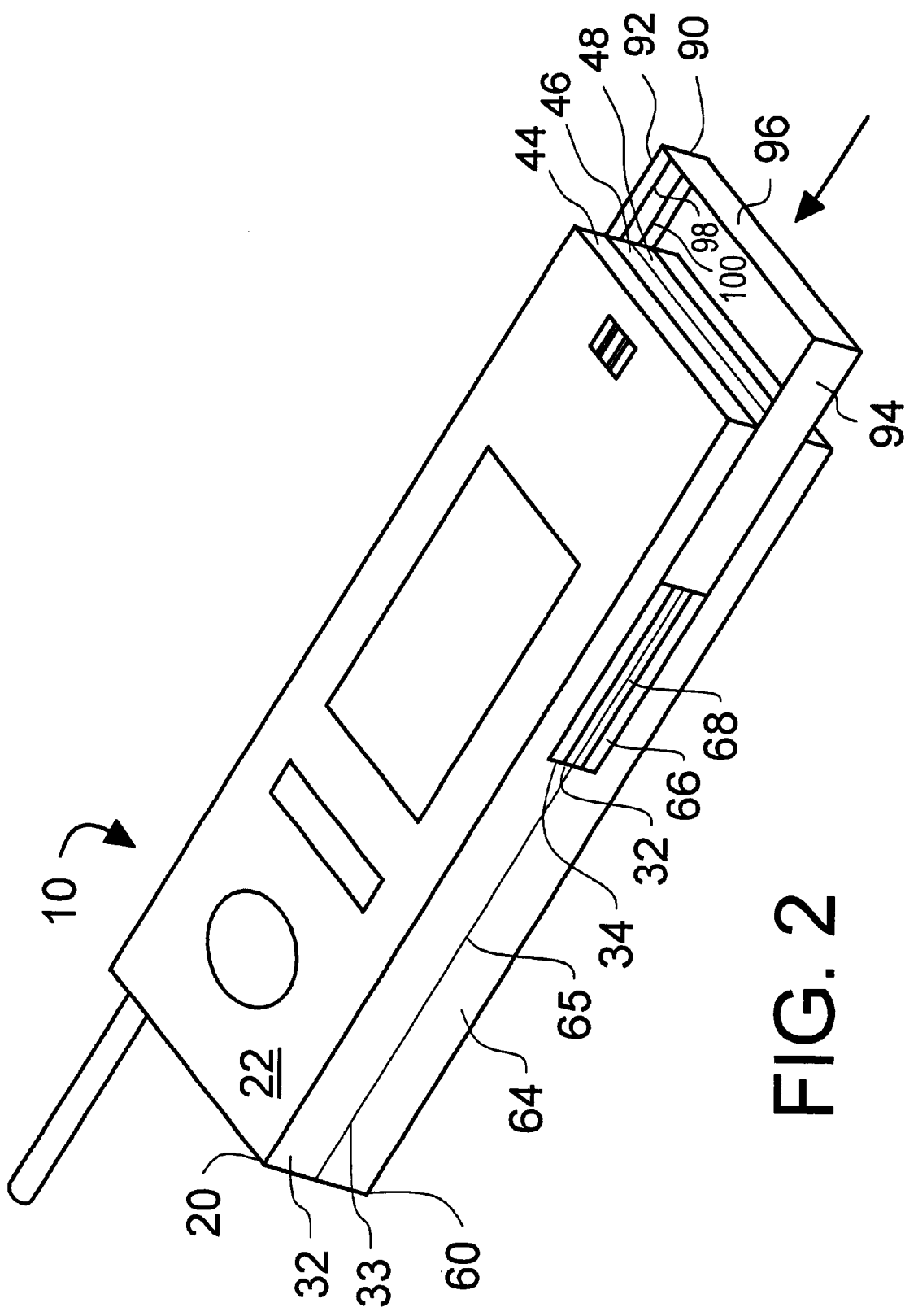
FIG. 2 is a perspective view of an assembled mobile phone according to one embodiment of the present invention.

FIG. 2 presents a perspective view of a partially assembled mobile phone 10, with cover connector member 90 partially attached to phone 10. Referring to FIG. 2 it may be seen that cover connector member 90 may be slidably engaged with phone 10 by applying an axial force along base 96. As illustrated in FIG. 2, cover connector member 90 covers a desired portion of the seam between front cover 20 and back cover 60. Many mobile phones have antenna covers that cover the portions of the seam between the front cover 20 and the bottom cover 60 near the antenna. One of ordinary skill in the art will appreciate that the legs 92 and 94 of cover connector member 90 could be lengthened to cover more of the seam or shortened to cover less of the seam as desired.

FIG. 3 is a partial cross-sectional view, taken along a longitudinal axis extending through mobile phone 10. FIG. 3 illustrates end wall 44 depending from front panel 22 of front cover 20 and end wall 76 depending from back panel 62 of back cover 60. Cover connector member 90 is shown in position covering the seam between front cover 20 and back cover 60. More particularly, the cross section of FIG. 3 is taken through base 96 of cover connector member 90 and shows first locking member 98 engaged with locking channel 48 and second locking member 100 engaged with locking channel 80. In this manner, cover connector member 90 facilitates securing front cover 20 to bottom cover 60.

Thus, cover connector member 90 provides a mechanically simple, low-cost part for reducing the visibility of cosmetic mismatches between front cover 20 and bottom cover 60. Additionally, cover connector member 90 contributes to the overall rigidity of the phone. This can eliminate the need to form complex geometric patterns designed to increase the rigidity of the back cover 60 of the phone, further reducing manufacturing costs associated with the phone. Further, because cover connector member 90 can function as a fastener, it can take the place of other fasteners (e.g., screws) between front cover 20 and bottom cover 60 such that the incorporation of cover connector member 90 need not increase the total part count of a mobile phone. Finally, cover connector member 90 solves the problems of reducing the visibility of cosmetic mismatches and mechanical mismatches between the front cover 20 and back cover 60 of a mobile phone that can contribute positively to the overall design appeal of the phone.

The present invention has been described with reference to particular embodiments. It will be understood that the claims are not limited to the particular embodiments described herein, but should be construed to cover structural equivalents and modifications consistent with the ordinary skill in the art.

We claim:
1. A mobile communication device, comprising:
   a printed circuit board having electrical and electromechanical components for transceiving electromagnetic signals;
   a front cover having a front panel and including first and second opposing walls depending from the front panel and terminating in opposing edges, the first and second opposing walls including first locking channels extending proximate the edges;
   a back cover having a back panel and including first and second opposing walls depending from the back panel and terminating in opposing edges, the first and second opposing walls including second locking channels extending along a portion of the wall proximate the edges;
   the front cover mechanically connectable to the back cover to define a seam between the edges of the front cover and the back cover; and a cover connector member having a first leg and a second leg connected by a base, and including
  a first locking member depending from an inner surface of the cover connector member and dimensioned to fit securely within the first locking channels, and
  a second locking member depending from an inner surface of the cover connector member and dimensioned to fit securely within the second locking channels;
such that, when the communication device is assembled, the cover connector member provides a secure mechanical connection between the front cover and the back cover and conceals a portion of the seam between the front cover and back cover of the mobile communication device.

2. A mobile communication device according to claim 1, wherein:
  the front cover is formed as a convex shell having a back panel and four walls terminating in four separate edges defining two opposing sides and two opposing ends.

3. A mobile communication device according to claim 2, wherein:
  the back cover is formed as a convex shell having a front panel and four walls terminating in four separate edges defining two opposing sides and two opposing ends.

4. A mobile communication device according to claim 3, wherein:
  the corresponding edges of the front and back cover connect along a seam defining a plane.

5. A mobile communication device according to claim 1, wherein:
  the cover connector member, when connected to the housing, covers the seam between front cover and back cover along one end of the phone and along portions of two sides of the phone.

6. A mobile communication device according to claim 1, wherein:
  the locking channels of the front cover and the back cover extend substantially parallel to the edges.

7. A mobile communication device according to claim 1, wherein:
  the front cover is formed from a material selected from the group of materials including polymers, polymer composites, magnesium, aluminum, zinc, stainless steel, titanium and nickel-titanium alloys.

8. A mobile communication device according to claim 1, wherein:
  the back cover is formed from a material selected from the group of materials including polymers, polymer composites, magnesium, aluminum, zinc, stainless steel, titanium, and nickel-titanium alloys.

9. A housing for a mobile communication device, comprising:
  a front cover having a front panel and including first and second opposing walls depending from the front panel and terminating in opposing edges, the first and second opposing walls including first locking channels extending proximate the edges;
  a back cover having a back panel and including first and second opposing walls depending from the back panel and terminating in opposing edges, the first and second opposing walls including second locking channels extending along a portion of the wall proximate the edges;
  the front cover mechanically connectable to the back cover to define a seam between the edges of the front cover and the back cover; and
  a cover connector member having a first leg and a second leg connected by a base, and including
    a first locking member depending from an inner surface of the cover connector member and dimensioned to fit securely within the first locking channels, and
    a second locking member depending from an inner surface of the cover connector member and dimensioned to fit securely within the second locking channels;
  such that, when the communication device is assembled, the cover connector member provides a secure mechanical connection between the front cover and the back cover and conceals a portion of the seam between the front cover and back cover of the mobile communication device.

10. A mobile communication device according to claim 9, wherein:
  the front cover is formed as a convex shell having a back panel and four walls terminating in four separate edges defining two opposing sides and two opposing ends.

11. A mobile communication device according to claim 10, wherein:
  the back cover is formed as a convex shell having a front panel and four walls terminating in four separate edges defining two opposing sides and two opposing ends.

12. A mobile communication device according to claim 11, wherein:
  the corresponding edges of the front and back cover connect along a seam defining a plane.

13. A mobile communication device according to claim 12, wherein:
  the cover connector member, when connected to the housing, covers the seam between front cover and back cover along one end of the phone and along portions of two sides of the phone.

14. A mobile communication device according to claim 9, wherein:
  the locking channels of the front cover and the back cover extend substantially parallel to the edges.

15. A mobile communication device according to claim 9, wherein:
  the front cover is formed from a material selected from the group of materials including polymers, polymer composites, magnesium, aluminum, zinc, stainless steel, titanium and nickel-titanium alloys.

16. A mobile communication device according to claim 9, wherein:
  the front cover is formed from a material selected from the group of materials including polymers, polymer composites, magnesium, aluminum, zinc, stainless steel, titanium and nickel-titanium alloys.

17. A method of assembling a mobile communication device housing, comprising the steps of:
  (a) providing a front cover having a front panel and including first and second opposing walls depending from the front panel and terminating in opposing edges, the first and second opposing walls including first locking channels extending proximate the edges;
  (b) connecting a back cover to the front cover, the back cover having a back panel and including first and second opposing walls depending from the back panel and terminating in opposing edges, the first and second opposing walls including second locking channels extending along a portion of the wall proximate the edges, such that the front cover and back cover define a seam between the edges of the front cover and the back cover; and (c) positioning a cover connector member over a portion of the seam between the edges of the front cover and the back cover, the cover connector member having a first leg and a second leg connected by a base, and including a first locking member depending from an inner surface of the cover connector member and dimensioned to fit securely within the first locking channels, and a second locking member depending from an inner surface of the cover connector member and dimensioned to fit securely within the second locking channels;

(d) securing the cover connector locking members within the locking channels such that the cover connector member provides a secure mechanical connection between the front cover and the back cover and conceals a portion of the seam between the front cover and back cover of the mobile communication device housing.

* * * * *